United States Patent [19]

Jackson

[11] 4,213,565
[45] Jul. 22, 1980

[54] SPRAYING SYSTEM

[76] Inventor: Clarence L. Jackson, 819 Caseyville Rd., Caseyville, Ill. 62232

[21] Appl. No.: 950,789

[22] Filed: Oct. 12, 1978

Related U.S. Application Data

[63] Continuation of Ser. No. 776,948, Mar. 14, 1977, abandoned.

[51] Int. Cl.² ............................................. B05B 1/20
[52] U.S. Cl. ................................... 239/170; 239/167
[58] Field of Search ................ 239/159, 164, 166-170

[56] References Cited

U.S. PATENT DOCUMENTS

| | | | |
|---|---|---|---|
| 2,584,484 | 2/1952 | McIntosh | 239/169 X |
| 3,236,456 | 2/1966 | Ackley et al. | 239/170 X |
| 3,301,487 | 1/1967 | Young | 239/168 |
| 3,425,628 | 2/1969 | Reams | 239/168 |
| 3,902,667 | 9/1975 | Jackson | 239/167 |

Primary Examiner—Robert W. Saifer
Attorney, Agent, or Firm—Kalish & Gilster

[57] ABSTRACT

A spraying system for use with vehicles which comprises a single pump connected to a supply of liquid material to be discharged, a vehicle transmission connecting said pump operatively to the transfer case of the vehicle, said pump having a pair of discharge ports each of which is connected to a diverter valve. Each diverter valve on one side being connected to a spray boom and on the other side thereof is in communication with a liquid return line. The spray booms are independently vertically and horizontally adjustable relative to the vehicle by means of fluid actuated devices. Each diverter valve is remotely controlled, independently of the other, for selectedly directing liquid to the associated spray boom or to the return line.

13 Claims, 9 Drawing Figures

SPRAYING SYSTEM

CROSS-REFERENCE TO RELATED APPLICATION

This is a continuation of application Ser. No. 776,948, filed Mar. 14, 1977, now abandoned.

BACKGROUND AND SUMMARY OF THE INVENTION

This invention relates in general to spraying systems for agricultural purposes and, more particularly, to a system adapted for disposition upon a vehicle.

Heretofore the most precise and efficient systems for spraying liquids upon the ground from a vehicle have been those incorporating a separate pump for delivery of the liquid to an associated spray boom; with each pump embodying its related intake and discharge, and with drive control means therefor. Understandably, such systems with their multiplicity of components have been costly in production; complex in upkeep; and of such considerable weight as to limit the application of such systems to vehicles of commensurate load capacity.

The present invention provides a spraying system as for agricultural purposes which is equally adapted for operation commensurate with the vehicle ground speed, but which embodies a single pump and utilizes valves for controlling flow, selectedly, to the usual pair of spray booms. Thus, the present invention constitutes a relatively simple assemblage which markedly reduces the load supporting requirements of the vehicle.

Therefore, it is an object of the present invention to provide a spraying system of the character stated which is adapted for integration upon existing vehicles of relatively light weight, such as the conventional pick-up truck as opposed to heavier, and more specialized vehicles, thereby eliminating the need for costly production of heavy vehicles.

It is another object of the present invention to provide a spraying system of the type stated which incorporates a pair of spray booms, each of which is uniquely adapted for movement into the particular spraying disposition independently of the other and being thus adjustable in both azimuth and vertically.

It is a further object of the present invention to provide a spraying system of the character stated which embodies a single pump which is engageable to the transmission of the vehicle so as to operate at a speed commensurate with the rate of ground travel thereby effecting economic distribution of the liquid being dispensed.

It is a still further object of the present invention to provide a spraying system incorporating a single pump having dual discharge ports engageable to related diverter valves whereby associated spray booms may be selectedly charged.

It is another object of the present invention to provide a spraying system of the character stated permitting of operational control from a remote point such as in the cab of the vehicle.

It is another object of the present invention to provide a spraying system embodying spray booms which are individually adjusted for horizontal and vertical disposition.

It is a still further object of the present invention to provide a spraying system which is most economic in construction; being comprised of a limited number of sturdy components; which may be easily installed and repaired; and which is reliable and durable in operation.

DESCRIPTION OF THE PREFERRED EMBODIMENT

Figure 1:
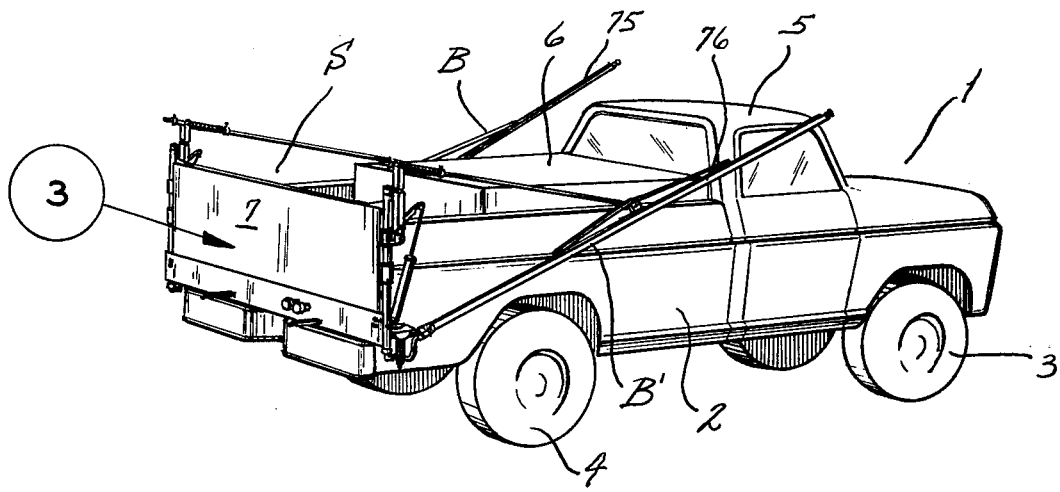
FIG. 1 is a rear perspective view of a truck having mounted thereon a spraying system constructed in accordance with and embodying the present invention.

Referring now by reference characters to the drawings which illustrate the preferred embodiment of the present invention, 1 generally designates a vehicle, such as a truck of conventional design, being, for example, one of the usual pick-up type, having a body 2 supported by pairs of front and rear ground wheels 3,4 and having a truck bed b incorporating a cab 5. Provided for disposition upon bed b is a liquid supply tank 6; there being mounted upon said vehicle 1, rearwardly of tank 6, a spraying system, indicted broadly at S, the components of which are normally obscured by a swingably mounted closure plate or tail gate 7 which latter cooperates with the opposed side panels for enclosing the rear or load-carrying portion of vehicle 1. Vehicle 1 may be of four-wheel drive type, having a front wheel drive shaft and a rear wheel propeller shaft operatively interconnected within a conventional transfer case (not shown) supported in the customary manner from the frame f of said vehicle 1. Tank 6 accordingly constitutes a reservoir for the particular liquid to be dispensed by spraying system S, such as, for instance, fertilizing solutions and the like as used for agricultural purposes.

Connected, as by a sprocket and chain, to a power take-of of the vehicle transfer case is a shaft 8 which extends rearwardly under the vehicle frame f for journalling within bearings, as pillow blocks (not shown) depending from component of frame f and projecting at its rearward end beyond the proximate element of frame f for operational disposition thereon of longitudinally spaced-apart drive sprockets or gears 9,10; said latter being the more rearwardly and of lesser diameter than the former. It is to be recognized that vehicle frame f comprise a multiplicity of rigidly interconnected constituents for supporting body 2 but such term is also utilized herein to comprehend fixed superstructural elements for providing requisite mountings for various of the components of spraying system S and thereby avoiding the necessity of describing the basically obvious.

Figure 8:
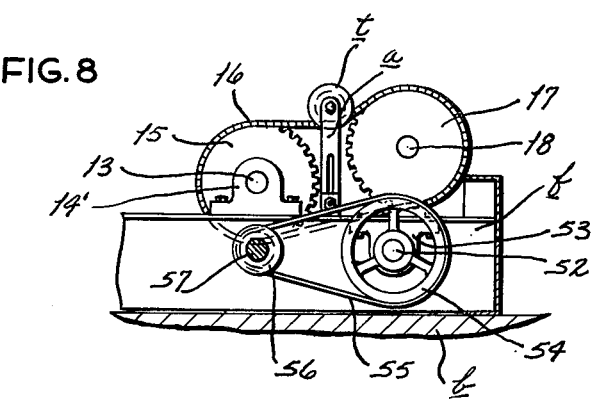
FIG. 8 is a vertical view, in partial section, taken on the line 8—8 of FIG. 5.

Engaged about sprocket 10 is the lower end portion of a transmission chain 11 which progresses upwardly for engagement of the upper end portion thereof about a driven sprocket 12, relatively enlarged with respect to sprocket 10 for speed reduction, and being carried upon the rearward end portion of a counter shaft 13; which latter is axially parallel to shaft 8 and journalled at its opposite ends in rear and forward pillow blocks 14,14′, respectively, bolted or otherwise secured upon frame f; the forward end of said shaft 13 terminating spacedly rearwardly of tank 6. Forwardly of sprocket 12, adjacent pillow block 14′, counter shaft 13 mounts the fixed member m of an electrically operated clutch C for engagement upon operation with a conventional free running member m′ to which is engaged a sprocket 15 about which is disposed one end portion of a chain 16, the other end portion of which is engaged about a driven sprocket 17 (see FIG. 8) fixed upon the forward end portion of a crank shaft 18 of a crankcase 19 of a spray pump P. Thus, crank shaft 18 will be inoperative until the vehicle operator closes the usual circuit for effecting interengagement of clutch members m,m′ whereby sprocket 15 is rotated for transmission of motion to crank shaft 18. Between sprockets 15,17, chain 16, in its upper course, is subjected to a tension roller t carried on the upper end of a vertically adjustable arm a fixed on frame f.

Pump P is of the double-acting, variable stroke, twin piston, positive displacement character, embodying a manifold casing 20 connected to crankcase 19 by the usual pump stuffing boxes 21,22. Said manifold casing 20 is provided on its underside with the usual inlet 23 for engagement to a liquid feed line 24 extending from tank 6; there being a shut-off valve 25 interposed therein. Manifold casing 20 internally is provided with the usual juxtaposed compartments (not shown) but in lieu of the customary single outlet, contains a separate discharge port or outlet for each compartment, as indicated at 26,27 which latter at the upper ends thereof are suitably connected as by elbows 28,28′, respectively, to conduits 29,30, respectively, directed therefrom laterally and slightly forwardly for connection at their opposite ends to the inlets, as at 31,32, respectively, at the underside of diverter valves 33,34, respectively. Said diverter valves 33,34 are of like construction; each having opposed lateral outlets on their outer sides, as at 35,35′, for communication with boom supply lines 36,36′, respectively, and on their inner sides, as at 37,37′ to the opposite ends of a T-fitting 38, the stem 39 of which projects downwardly and rearwardly for connection to a return conduit or so-called sparger line 40 leading at its opposite end to tank 6.

Each diverter valve 33,34 may be of the directional ball valve type designed to accept liquid through the respective bottom inlet 31,32 and direct same out either outlet 35,35′ or 37,37′; the same embodying a two-way valve element (not shown) positional by means of control arms 41,41′, respectively, provided on the upper ends of valves 33,34, respectively, and engaged to the outer forward ends of pistons 42,42′, respectively, of hydraulic cylinders 43,43′, respectively. Said cylinders 43,43′ are suitably swingably mounted at their rearward ends on bosses 44,44′ provided on frame f. No invention is claimed in the precise construction of the diverter valves 33,34. Thus, each of said diverter valves 33,34 may be operated so as to selectively permit flow of liquid received from the respective pump manifold outlet 26,27 to be directed to the associated boom supply line 36,36′, as the case may be, or be returned to tank 6 through line 40. Each of said hydraulic cylinders 43,43′ is adapted for operation through solenoid valves, indicated 45,45′, respectively, which may be conveniently and remotely controlled by the vehicle operator within cab 5; said solenoid valves 45,45′ being connected to sources of fluid supply for effecting retraction or extension of the related piston 42,42′ for effecting disposition of valve arms 41,41′, respectively. It is, of course, recognized that cylinders 43,43′ are operated independently of each other whereby the related diverter valve 33,34, as the case may be, is so controlled that liquid may be directed to either of said boom supply lines 36,36′ or to both simultaneously, as desired by the operator.

From the above, it is to be particularly noted that system S incorporates but a single pump having a pair of manifold outlets, each of which is suitably in communication with a diverter valve. This development is a marked advance over the art wherein heretofore in spraying systems of the present type there have been required separate, individual pumps with associated crankcases for each supply boom. The present system is reduced in complexity; and in the number of components with commensurate reduction in cost, as well as materially decreasing the overall weight of the system so as to markedly lessen the load-supporting requirements of the vehicle.

Figure 7:
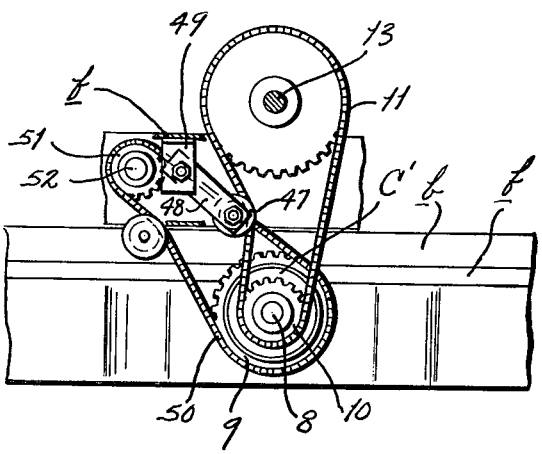
FIG. 7 is a vertical view taken on the line 7—7 of FIG. 5.

Crankcase 19 is provided on its rearward face with the customary dial 46 whereby the length of stroke of the crank shaft 18 may be controlled for providing the requisite displacement of pump P in view of the power available from the transfer case. As may best be seen in FIGS. 3 and 7, the pump adjacent course of transmission chain 11 is engageable by a tensioning roller 47 carried upon a longitudinally adjustable arm 48 secured upon a plate 49 fixed to frame f.

Figure 5:
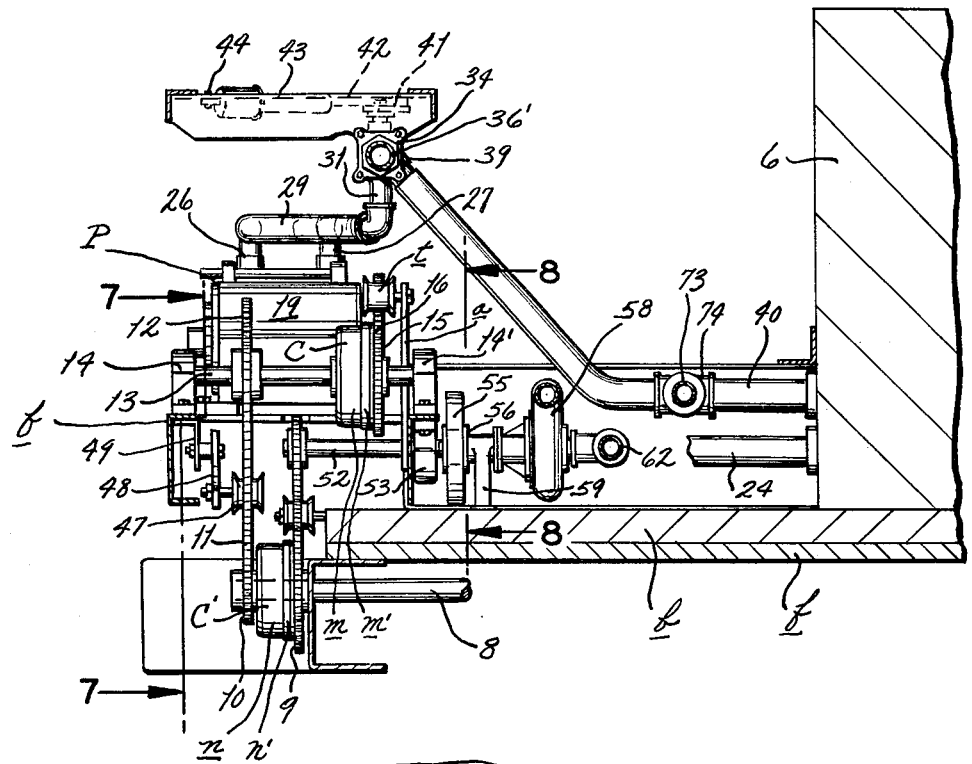
FIG. 5 is a vertical view, in partial section, taken on the line 5—5 of FIG. 3.
Figure 6:
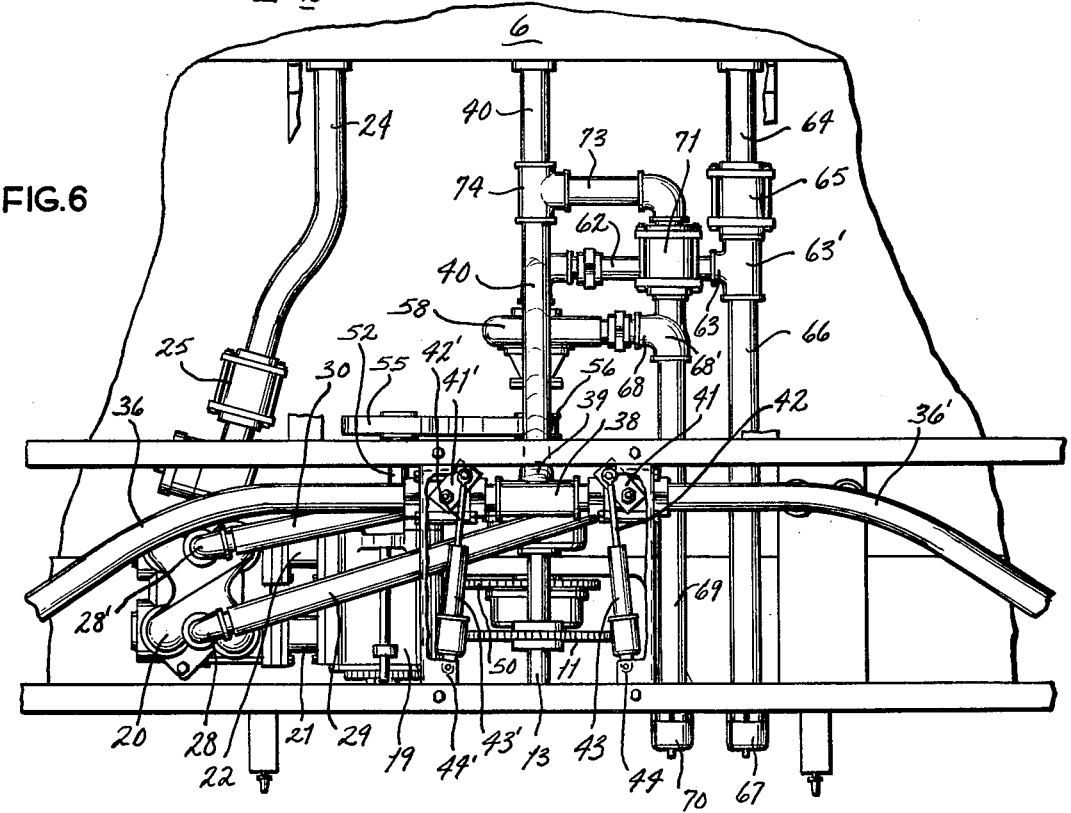
FIG. 6 is a horizontal view taken on the line 6—6 of FIG. 3.

Sprocket 9 is engaged to the free running member n′, disposed about shaft 8, of an electrically operated clutch C′ which incorporates the usual fixed member n secured upon shaft 8. Upon actuation of clutch C′ sprocket 9 is operatively connected to shaft 8 for rotation therewith through engagement of said clutch members n,n′. Engaged upon sprocket 9 is the lower end portion of a transmission chain 50 which extends upwardly and laterally, in the direction toward pump P, for disposition of its opposite end portion about a sprocket 51 of relatively reduced diameter, for speed increase, carried upon the rearward end portion of a jack shaft 52 journalled in a pillow block 53 affixed to an adjacent component of frame f (FIGS. 5 and 8) laterally and downwardly of pillow block 14′ and carrying on its forward end a pulley 54 about which is entrained one end of a V-belt 55, the opposite end of which is engaged about a pulley 56 of relatively reduced diameter and mounted on the forward end of the drive shaft 57 of a sparger pump 58 being of centrifugal type. Said pump drive shaft 57 is journalled at its forward end, projecting beyond pump 58, in a bearing 59 rigid on frame f. The suction side 60 of pump 58 is connected, as by an elbow 61, to a short conduit 62; which latter at its remote end is engaged to the stem 63 of a T-fitting 63′. One end of T-fitting 63 is in communication with tank 6 through a sparger pump supply line 64; there being a cut-off valve 65 interposed between said fitting 63′ and tank 6. The opposite or rearward end of T-fitting 63′ is connected to the forward end of a fill line or pipe 66 which projects beyond the rearward end of vehicle 1; the rearward end of said line 66 being adapated for connection to a liquid reservoir and carrying a removable closure cap 67. The outlet or discharge side of sparger pump 58 is connected to the stem 68 of a T-fitting 68'; the forward end of which latter is engaged to a load-out line or pipe 69 progressing rearwardly and terminating immediately beyond the rearward end of vehicle 1 adjacent line 66 and being normally closed by a detachable cap 70. The opposite or rearward end of T-fitting 68' is engaged to a cut-off valve 71 the opposite side of which is in communication with return or sparger line 40 via an elbow fitting 72, a short conduit 73, and a T-fitting 74 disposed within said line 40.

Thus, it will be seen that sparger pump 58, sometimes referred to as an agitation pump, is used in the accepted primary fashion for effecting filling and emptying of tank 6; with the latter being accomplished by closing of valve 71 and with flow through conduit 64, fitting 63', conduit 62, pump 58, and conduit 69; said line 66 having been previously capped. The former or filling of tank 6 is effected by drawing liquid through conduit 66 after connection to a supply reservoir, with valve 65 having been closed, and thence to sparger line 40 via fitting 63', conduit 62, pump 58, fitting 68', valve 71, and conduit 72; with conduit 69 being obviously previously capped.

Figure 4:
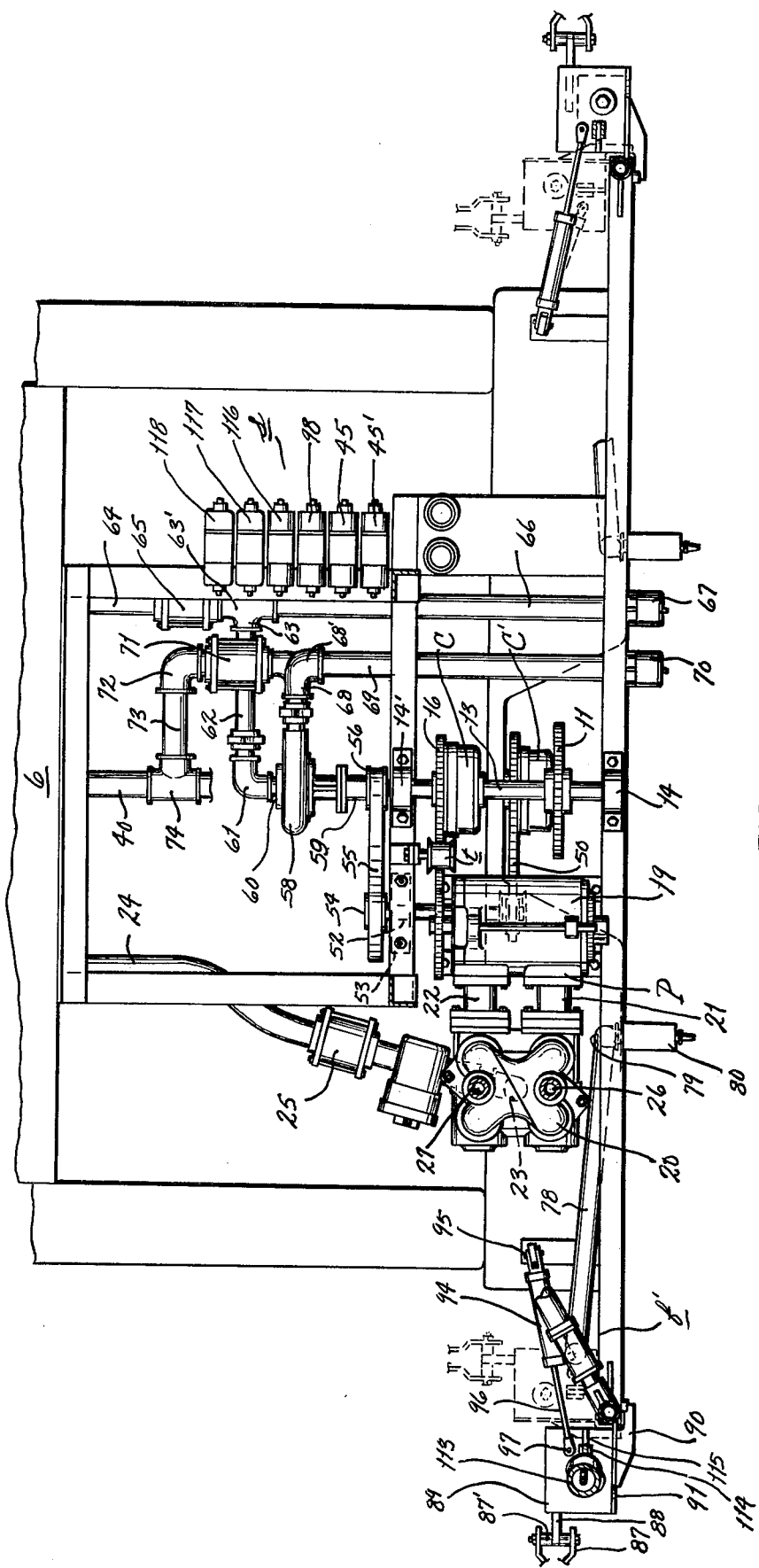
FIG. 4 is a horizontal view, partially in section, taken on the line 4—4 of FIG. 3.

As shown in FIG. 4 a series of solenoid valves, including valves 45,45', is arranged in a bank, as at s, upon frame f, rearwardly of tank 6 for incorporation in assemblages to permit the vehicle operator to control positioning of spray booms as will be discussed hereinbelow, as well as for controlling the operation of the diverter valves 33,34. It should be, of course, recognized that valves 25, 65 and 71 are also adapted for remote operation within cab 5, all in accordance with well known constructions.

Figure 2:
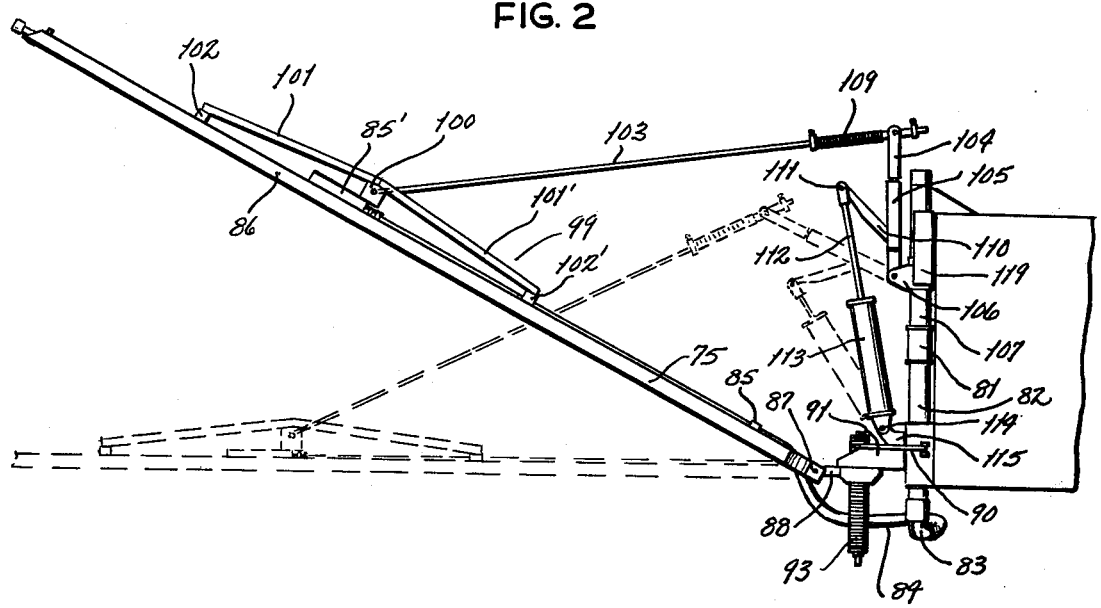
FIG. 2 is a side elevational view of the left-hand boom.
Figure 3:
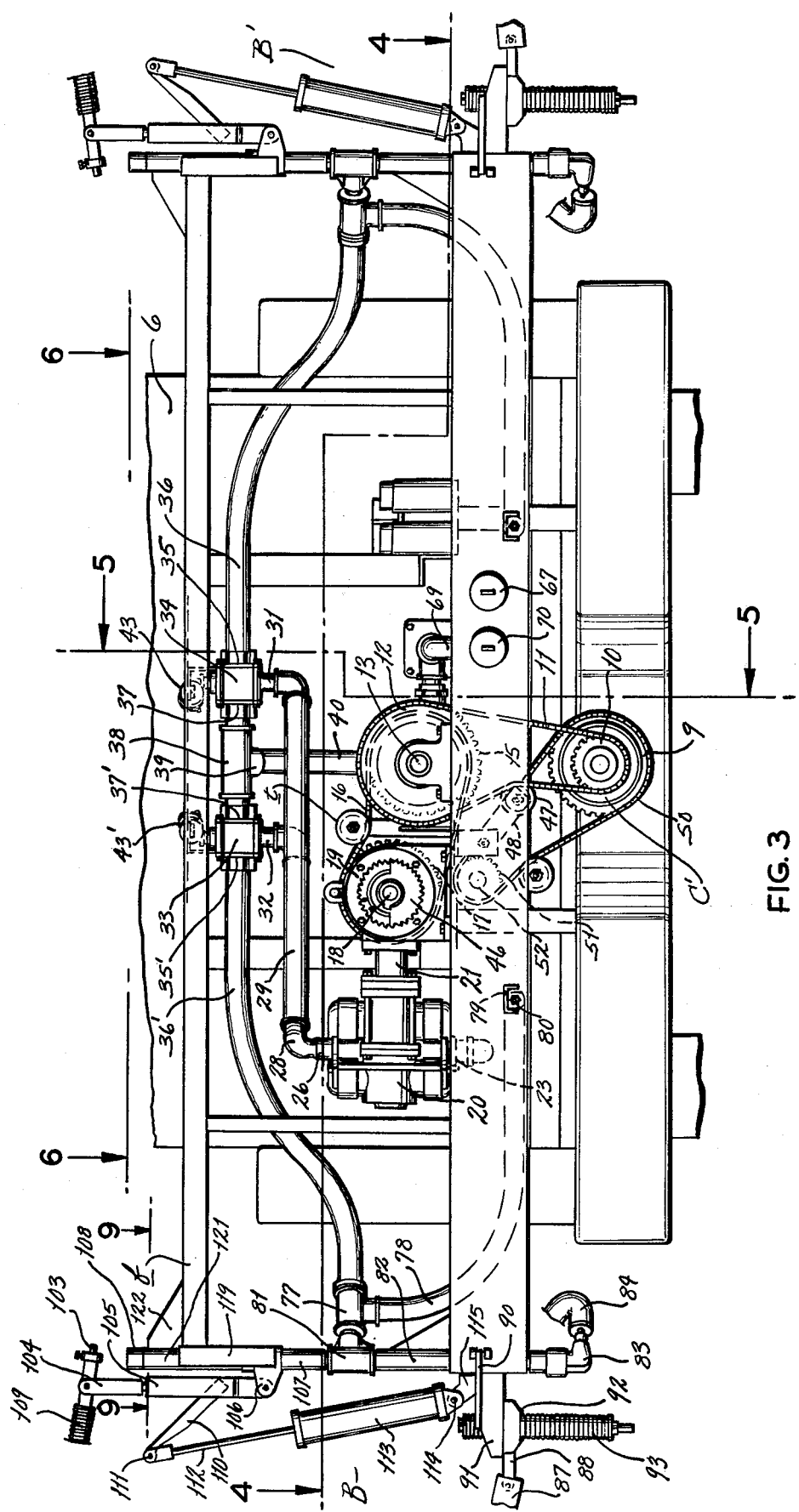
FIG. 3 is an elevational view taken at the reference 3 in FIG. 1, but with the closure plate removed.

Turning now to FIGS. 2, 3 and 4 it will be seen that boom supply conduits 36,36' extend laterally and thence rearwardly for flow of the spray liquid to spray boom 75,76, respectively, of boom assemblies B,B' which are located at either side of the rearward portion of vehicle 1 for independent positioning as will be described hereinafter. Since each of said assemblies B,B' are of like construction, only assembly B disposed on the left-hand side of vehicle 1, as viewed in FIG. 1, will be described for brevity.

Supply conduit 36 is connected at its diverter valve remote end to one side of a T-fitting 77 (FIG. 3) located downwardly of diverter valve 33 and which at its lower or stem end is secured to a flexible conduit or hose 78 continuing downwardly and laterally inwardly for engagement, as by fitting 79, to a spray nozzle 80 projecting rearwardly from vehicle 1 completing the spray-pattern of the associated spray boom assembly, as will appear more fully hereinbelow. The other end of T-fitting 77 is in communication through the lower end of a vertically disposed T-fitting 81 with the upper end of a vertical conduit 82 suitably supported by frame f, the lower end thereof being connected through a swivel unit 83 with a flexible conduit of boom hose 84. Boom hose 84 extends along, and is supported upon, the proximal portion of spray boom 75 with the other end thereof being secured to a fitting 85 for communication with the interior of said boom 75 as through a manifold 85'. Throughout its length boom 75 is provided with a plurality of longitudinally spaced-apart liquid discharge apertures, as at 86. Spray boom 75 at its lower end is engaged to a clevis 87 pivotally mounted on a cross arm 87' carried on a bracket 88 fixed to the underside of a horizontally disposed mounting plate 89 swingably supported, as by a collar (not shown) upon conduit 82 for movement within an arc of substantially 90° that is, between forward, inoperative position, as indicated in phantom lines in FIG. 4, and operative position as shown in full lines in FIGS. 3 and 4. In the former position, the normally rearward edge of said plate 89 limitingly abuts against a lateral extension f' of frame f; while in the latter position a stop plate 90 extending from frame extension f' abuts an upstanding side wall 91 carried on the normally side edge of said plate 89. Suitably fixed on mounting plate 89 is a vertically extending retainer 92 for a compression spring 93 urging plate 89 and retainer 92 into abutting relationship in order to maintain the related boom assembly in selected position. However, said relationship premits of a parting between said plate 89 and retainer 92, in the manner of a breakaway protector in the event the associated boom assembly sustanis any untoward force or impact as occasioned, for example, by obstacles within the path of travel of vehicle 1 or ground unevenness. The movement of plate 89 is determined by operation of a hydraulic cylinder 94 engaged at its inner end upon vehicle frame f, as through a clevis-type mounting, as at 95; said cylinder 94 having a piston 96, the outer end of which is secured to plate 89, as at 97. Thus, cylinder 94 controls the horizontal swinging of boom assembly B and is in conventional connection to solenoid valve 98 whereby the operator may remotely effect positioning of spray boom 75 relatively horizontally to vehicle 1.

Spray boom 75 is maintained against accidental or uncontrolled displacement by means of a brace arm assembly 99 comprising a block 100 fixed upon manifold 85' and to which the abutting ends of a pair of brace arms 101,101' are secured, as by welding, with the opposite ends of said arms 101, 101' being rigid with brackets 102,102', respectively, rigid on spray boom 75. Pivotally engaged to block 100 at its normally outer end is a lift rod 103, the other or inner end of which is siwngably secured to a swivel yoke 104 carried upon the upper end of an arm 105. The lower end of arm 105 is in turn rockably engaged to a bracket 106 adapted for swingable movement upon a pulsation or surge eliminator column 107 extending upwardly from the upper end of T-fitting 81. Pulsation eliminator column 107 is capped at its upper end, as at 108. It will be observed that lift rod 103 may be provided with a shock absorbing coil spring 109 adjacent the connection thereof to swivel yoke 104 in accordance with well known constructions.

Welded or otherwise fixed to arm 105 is the lower end of an upwardly and outwardly canted link 110, the outer upper end of which is pivotally engaged, as at 111, to the end of a piston 112 of a hydraulic cylinder 113. Said cylinder 113 at its lower end is swingably mounted, as at 114, upon a bracket 115 provided upon plate 89. The operation of hydraulic cylinder 113 thus controls the vertical disposition of spray boom 75 by elevating or lowering lift rod 103 (see FIG. 2); and with said cylinder 113 being suitably connected through a solenoid valve 116 in bank s to control button or the like in vehicle cab 5; therefore, the disposition of spray booms 75 in azimuth and vertically is adjusted by selected operation of cylinders 94,113 through cab controlled energization of solenoid valves 98, 116, respectively. The remaining solenoid valves in bank s as at 117,118 are connected to the corresponding cylinders 94,113 of spray boom assembly B'.

Figure 9:
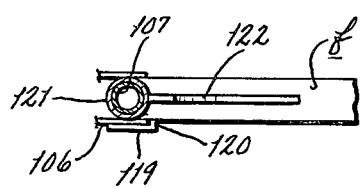
FIG. 9 is a horizontal transverse sectional view taken on the line 9—9 of FIG. 3.

As may best be seen in FIGS. 3 and 9, welded or otherwise made rigid with bracket 106 for swinging therewith is an upwardly extending flat arm 119 which projects above the adjacent frame element, indicated at f in the upper left hand portion of FIG. 3 and including a forwardly turned flange 120 on its inner edge for abutment against the rearward face of said frame component f limiting the arc of swing of said bracket 106. By reason of such stop-forming relationship between flange 120 and frame f, yoke 104 may then swivel to shorten lift rod 103 to cause spray boom 75 to elevate and thereby avoid dragging the ground when plate 89 and retainer 92 are parted for relative movement in break-away condition. Concurrently, by reason of the abutment of flange 120 against frame f, cylinder 113 is rendered stable and, hence, resistant to damage. Cap 108 at the upper end of column 107 sits upon the upper end of a collar 121 encircling column 107 and being rigid with a gusset plate 122 which is fixed to the adjacent frame portion f.

It is to be observed that the incorporation of clutches C, C' provide the vehicle operator with control of operations of pump P and sparger pump 58 so that the same are operating only at selected, effective periods. Thus, when the vehicle is effecting a change of direction or traveling through a particular zone for which spraying is not to be effective, pump P may be temporarily de-energized by disengagement of the components of clutch C, with re-engagement being brought about when the vehicle has been restored to traverse an area to be sprayed. The similar control over sparger pump 58 through clutch C' is apparent from the foregoing.

Having described my invention, what I claim and desire to obtain by Letters Patent is:

1. For use with a vehicle having a source of supply of treatment liquid to be dispensed and a transfer case, a spraying system comprising a single pump for pumping said liquid, said pump being mounted upon said vehicle and being of a variable stroke, positive displacement character and having first and second pistons and associated first and second compartments, said pump having a suction side connected to said source of supply liquid for supplying fluid for pumping by said pistons, means operatively engaging said pump to said transfer case for operation of said pump correspondingly to ground travel of said vehicle, said pump having a discharge side comprising a first outlet port associated with said first compartment and a second outlet port associated with said second compartment, first and second diverter valves, first means connecting said first diverter valve with said first pump outlet port, second means connecting said second diverter valve with said second pump outlet port, a boom assembly mounted upon said vehicle laterally outwardly of each of said first and second diverter valves, said boom assembly comprising a spray boom and a manifold for discharging the liquid onto the area to be treated, said manifold being supported by said spray boom, conduit-forming means connecting said first and second diverter valves with the proximate manifold, each of said first and second conduit-forming means including a conduit connected at one end to the associated diverter valve, a vertically disposed pipe mounted on said vehicle, means connecting the other end of each conduit to the related pipe substantially intermediate its length, means connecting each of said pipes at their lower ends to the adjacent manifold, each of said pipes in their portions above the connection to the associated conduit being closed to provide a surge eliminating chamber.

2. The invention as defined in claim 1 and further characterized by said first and second diverter valve control means comprising first and second fluid cylinders operatively engaged to said first and second diverter valves and remote control means for effecting operation of said cylinders for disposing the associated valve in predetermined position.

3. The invention as defined in claim 1 and further characterized by each of said first and second conduit-forming means including a conduit connected at one end to the associated diverter valve, pipe-forming means mounted on said vehicle between each boom assembly and the proximate diverter valve, means connecting the other end of each conduit to the associated pipe-forming means, and means interposed between said pipe-forming means and the adjacent manifold for establishing communication therebetween.

4. The invention as defined in claim 3 and further characterized by said pipe-forming means being vertically disposed, each of said conduits being connected to the related pipe-forming means substantially intermediate the length thereof, and the means establishing communication between each pipe-forming means and the adjacent manifold being at the lower end of said pipe-forming means.

5. The invention as defined in claim 4 and further characterized by each of said pipe-forming means above the connection to the associated conduit being closed to provide a surge eliminating chamber.

6. The invention as defined in claim 3 and further characterized by said means interposed between said pipe-forming means and the adjacent manifold being a flexible conduit.

7. The invention as defined in claim 3 and further characterized by each boom assembly having a lift rod engaged to the related spray boom, and a first hydraulic cylinder operatively connected to said lift rod for lowering and raising said associated spray boom respective to operation of said cylinder.

8. The invention as defined in claim 7 and further characterized by a second hydraulic cylinder swingably mounted upon said vehicle and having a reciprocally movable piston, and means engaging each of said pistons with the adjacent spray boom for effecting horizontal movement thereof.

9. For use with a vehicle having a source of supply of treatment liquid to be dispensed and a transfer case, a spraying system comprising a pump mounted upon said vehicle having a suction side connected to said source of supply of liquid, means operatively engaging said pump to said transfer case for operation of said pump correspondingly to ground travel of said vehicle, said pump having a discharge side comprising first and second outlet ports, first and second diverter valves, first means connecting said first diverter valve with said first pump outlet port, second means connecting said second diverter valve with said second pump outlet port, a boom assembly mounted upon said vehicle laterally outwardly of each of said first and second diverter valves, said boom assembly comprising a spray boom and a manifold for discharging the liquid onto the area to be treated, said manifold being supported by said spray boom, conduit-forming means connecting said first and second diverter valves with the proximate manifold, each of said first and second conduit-forming means including a conduit connected at one end to the associated diverter valve, a vertically disposed pipe mounted on said vehicle, means connecting the other end of each conduit to the related pipe substantially intermediate its length, means connecting each of said pipes at their lower ends to the adjacent manifold, each of said pipes in their portions above the connection to the associated conduit being closed to provide a surge eliminating chamber.

10. The invention as defined in claim 9 and further characterized by a flexible conduit engaged at one end to the lower end of the associated vertically disposed pipe, said flexible conduit being engaged at the other end thereof to the adjacent manifold, a lift rod engaged to each spray pump and a first hydraulic cylinder operatively connected to said lift rod for lowering and raising said spray boom.

11. The invention as defined in claim 10 and further characterized by a second hydraulic cylinder swingably mounted upon said vehicle and having a reciprocally movable piston, and means connecting each of said pistons with the associated spray boom for effecting movement of the latter horizontally.

12. For use with a vehicle having a source of supply of treatment liquid to be dispensed and a transfer case, a spraying system comprising a pump mounted upon said vehicle having a suction side connected to said source of supply of liquid, means operatively engaging said pump to said transfer case for operation of said pump correspondingly to ground travel of said vehicle, said pump having a discharge side comprising a first outlet port, first and second diverter valves, first means connecting said first diverter valve with said first pump outlet port, second means connecting said second diverter valve with said second pump outlet port, a boom assembly mounted upon said vehicle laterally outwardly of each of said first and second diverter valves, said boom assembly comprising a spray boom and a manifold for discharging the liquid onto the area to be treated, said manifold being supported by said spray boom, conduit-forming means connecting said first and second diverter valves with the proximate manifold, and means connecting said first and second diverter valves with said source of supply of treatment liquid, first and second control means for said first and second diverter valves respectively through operation of which liquid from said pump may be directed through a particular diverter valve to either the associated spray boom supported manifold or to said source of supply of said treatment liquid, each of said first and second conduit-forming means including a conduit connected at one end to the associated diverter valve, pipe-forming means mounted on said vehicle between each boom assembly and the proximate diverter valve, means connecting the other end of each conduit to the associated pipe-forming means, and means interposed between said pipe-forming means and the adjacent manifold for establishing communication therebetween, said pipe-forming means being vertically disposed, each of said conduits being connected to the related pipe-forming means substantially intermediate the length thereof, and the means establishing communication between each pipe-forming means and the adjacent manifold being at the lower end of said pipe-forming means.

13. The invention as defined in claim 12 and further characterized by each of said pipe-forming means above the connection to the associated conduit being closed to provide a surge eliminating chamber.

* * * * *